United States Patent

Anan et al.

[11] Patent Number: 5,379,222
[45] Date of Patent: Jan. 3, 1995

[54] SYSTEM FOR CONTROLLING THE RUNNING STATE OF A VEHICLE IN ACCORDANCE WITH A STEERING ANGLE

[75] Inventors: Yoshiaki Anan; Tetsuhiro Yamashita; Mitsuru Nagaoka, all of Hiroshima, Japan

[73] Assignee: Mazda Motor Corporation, Hiroshima, Japan

[21] Appl. No.: 794,518

[22] Filed: Nov. 19, 1991

[30] Foreign Application Priority Data

Nov. 30, 1990 [JP] Japan .................. 2-340058

[51] Int. Cl.⁶ .................. G06F 15/20; B60T 8/32; B60G 17/02
[52] U.S. Cl. .................. 364/426.03; 364/424.05; 180/197; 280/707; 303/93
[58] Field of Search .................. 364/424.05, 426.01, 364/426.02, 426.03; 180/197, 142, 141; 280/707; 303/93, 94, 95, 96, 102, 103

[56] References Cited

U.S. PATENT DOCUMENTS

| | | | |
|---|---|---|---|
| 4,564,214 | 1/1986 | Tokunaga et al. | 280/707 |
| 4,602,695 | 7/1986 | Takeshima | 364/424.05 |
| 4,674,587 | 6/1987 | Suzuki et al. | 180/142 |
| 4,690,233 | 9/1987 | Daido | 180/142 |
| 4,720,791 | 1/1988 | Daido | 364/424.05 |
| 4,763,262 | 8/1988 | Leiber | 364/426.03 |
| 4,905,783 | 3/1990 | Bober | 180/142 |
| 4,947,328 | 8/1990 | Sugasawa | 364/424.05 |
| 4,947,332 | 8/1990 | Ghoneim | 364/426.03 |
| 5,032,996 | 7/1991 | Shiraishi | 364/424.05 |
| 5,181,175 | 1/1993 | Shiraishi et al. | 364/426.03 |

FOREIGN PATENT DOCUMENTS 0119564  9/1984  European Pat. Off. .
3546575  10/1987  Germany .

Primary Examiner—Thomas G. Black
Assistant Examiner—Collin W. Park
Attorney, Agent, or Firm—Sixbey, Friedman, Leedom & Ferguson

[57] ABSTRACT

A running state control system having running state control means for controlling a running state of a vehicle, in which a control target quantity thereof is set different according to a steering angle, comprises steering angle detecting means for detecting the steering angle, and steering angle changing means for changing the steering angle detected by the steering angle detecting means into a filtered steering angle a decrease of which lags behind a decrease of an actual steering angle. Consequently, an abrupt change in a control condition can be prevented even during a slalom run and counter steering of a vehicle, thus enhancing a running stability of the vehicle.

8 Claims, 6 Drawing Sheets

SYSTEM FOR CONTROLLING THE RUNNING STATE OF A VEHICLE IN ACCORDANCE WITH A STEERING ANGLE

BACKGROUND OF THE INVENTION

This invention relates to a running state control system for a vehicle.

As a running state control system for a vehicle, there is known a traction control system for preventing lowering of acceleratability owing to a spin of a driving wheel by an excessive driving torque during an acceleration. In the traction control system, a spin quantity of the driving wheel (difference between a wheel speed of the driving wheel and that of a driven wheel) is detected to control an engine output or brake force (namely, to decrease the engine output, or to increase the brake force) to the wheels so that the spin quantity of the driving wheel reaches to a target quantity.

It has been proposed in Japanese Patent Application Laying Open Gazette No. 64-30869 that in order to ensure a stability in lateral direction of the vehicle, the traction control system is provided with steering angle detecting means for detecting a steering angle of a handle and the target quantity for the brake control is lowered when the vehicle is activated and the handle is steered.

Another known running state control system is an automatic adjusting suspension (hereinafter referred to it as AAS). The AAS controls each damping ratio of shock absorbers respectively provided at a front right, front left, rear right and rear left of a vehicle according to the steering angle, namely the ratios are controlled to be large (soft) during a straight run and to be small (hard) during a turn. As a result, the vehicle is prevented from rolling during a turn.

In driving techniques of a vehicle, there are a slalom run, which the vehicle runs with the handle alternatively steered to the right and left, and a counter steering for recovering the vehicle state by steering the handle in a reverse direction of the vehicle, not in a forward direction in case the rear part of the vehicle turns sideways out from a running line.

The vehicle having the above traction control system or AAS has problems upon such the driving techniques.

Namely, in case of the vehicle with the traction control system in which the target quantity for a traction control by an engine output is set high during a strait run and set low during a turn so as to enhance the stability in lateral direction during a turn, when the steering angle becomes zero during the handle is steered, for example, from right to left, the engine output abruptly exceeds because of the high target quantity.

Also, the vehicle having the AAS has another problem that when the steering angle becomes zero, each damping ratio of the shock absorbers abruptly becomes large.

SUMMARY OF THE INVENTION

It is an object of the present invention to enhance a running stability by preventing abrupt changes in control condition even during a slalom run and counter steering by a running state control system in which a control target quantity for controlling a running state of a vehicle is set different according to the steering angle.

In this invention, when the steering angle is decreasing, in other words, when the handle is being returned to a neutral position from a condition steered to the right or left, a running state of the vehicle is controlled by a filtered steering angle a decrease of which lags behind a decrease of an actual steering angle by filtering a detected steering angle.

Therefore, the running state control system of the present invention having running state control means for controlling a running state of the vehicle in which the control target quantity is set different according to a control steering angle comprises:

steering angle detecting means for detecting an actual steering angle; and steering angle changing means for changing the control steering angle from the actual steering angle detected by the steering angle detecting means to the filtered steering angle the decrease of which lags behind the decrease of the actual steering angle.

In the above running state control system, when the actual steering angle is decreasing (during the steered handle is returned from the steered condition), the filtered steering angle larger than the actual steering angle is used. Hence, even when the actual steering angle becomes zero, the running state is controlled based on the control target quantity according to the filtered steering angle which is larger than the actual steering angle. As a result, the vehicle is prevented from temporal undesired running state during a slalom run or counter steering. In other words, the control system controls the running state based on the filtered large steering angle when the actual steering angle becomes zero, so as to enhance the running stability of the vehicle.

Preferably, the steering angle changing means bears a previous output value with a predetermined percentage to a present detected steering angle by the steering angle detecting means. This makes it possible to obtain the filtered steering angle the decrease of which lags behind the decrease of the actual steering angle.

In this case, it is preferable that the steering angle changing means obtains the filtered steering angle on the basis of a following exponential filter.

$$\theta H(K) \leftarrow \alpha \times |\theta(K)| + (1-\alpha) \times \theta H(K-1)$$

Wherein $\theta H(K)$ is an output value at a present time (filtered steering angle), $\theta H(K-1)$ is an output value at a previous time (filtered steering angle), $|\theta(K)|$ is an absolute value of a detected steering angle at the present time, and $\alpha$ is larger than 0 and smaller than 1.

A further preferred embodiment of the present invention is that the running state control system comprises steering angle decrease judging means for judging that the steering angle is decreasing when the absolute value of the present detected steering angle by the steering angle detecting means is smaller than the previous output value of the steering angle changing means, wherein the steering angle changing means changes the detected steering angle into the filtered steering angle when the steering angle decrease judging means judges the steering angle decrease. In this way, since the steering angle decrease is judged, comparing the filtered steering angle and actual steering angle, the judging means judges the steering angle decrease for a while even during the steering angle is increasing from zero. Thus, the steering angle used for controls does not abruptly decreases from the filtered steering angle into the actual steering angle at changing from a decrease into an increase of the actual steering angle.

In this case, the running state control means can serve as traction control means or AAS.

Preferably, the running state control means used as the traction control means is provided with engine control means for controlling the engine output so that a spin quantity of the driving wheel with respect to a road surface reaches to a first target quantity, and brake control means for controlling the brake force to be applied to the driving wheel so that the spin quantity of the driving wheel with respect to a road surface reaches to a second target quantity, wherein the first and second target quantities are set high during a straight run and set low during a turn of a vehicle according to the steering angle.

With this construction, the abrupt excessive engine output is prevented since the target quantity for the traction control is maintained comparatively high even though the actual steering angle becomes zero during a steering operation.

In this case, it is more preferable that the first and second target quantities are set so as to be large as a vehicle speed is high, and set so as to be small as a stepped quantity of an accelerator pedal is large. It is further preferable that the first and second target quantities set so as to be small as a road friction coefficient becomes small.

In case the running state control means is used as the AAS, it is preferable that the AAS controls actuators, provided at each shock absorber, for adjusting a damping ratio according to running state of the vehicle, and a target quantity for controlling each damping ratio is set large during a straight run and set small during a turn.

In this way, it can be avoided that the damping ratios become temporally small when the steering angle is zero during the handle operation, thus enhancing the running stability of the vehicle.

BRIEF DESCRIPTION OF THE DRAWINGS

FIGS. 1-7 show a first embodiment of the present invention, in which:

FIG. 1 is a block diagram showing a whole construction of the present invention;

FIG. 2 is a schematic illustration of an engine and brake system;

FIG. 3 is a time chart of a traction control;

FIG. 4 is a circuit diagram for determining a target spin quantity;

FIG. 5 is a flow sheet for controlling a steering angle change;

FIG. 6 is a time chart of a detected value of a steering angle; and

FIG. 7 is a time chart of a corrected output value of the steering angle, and

DESCRIPTION OF PREFERRED EMBODIMENTS

A description is made below about embodiments of the present invention with reference to accompanying drawings.

FIRST EMBODIMENT

Figure 1:
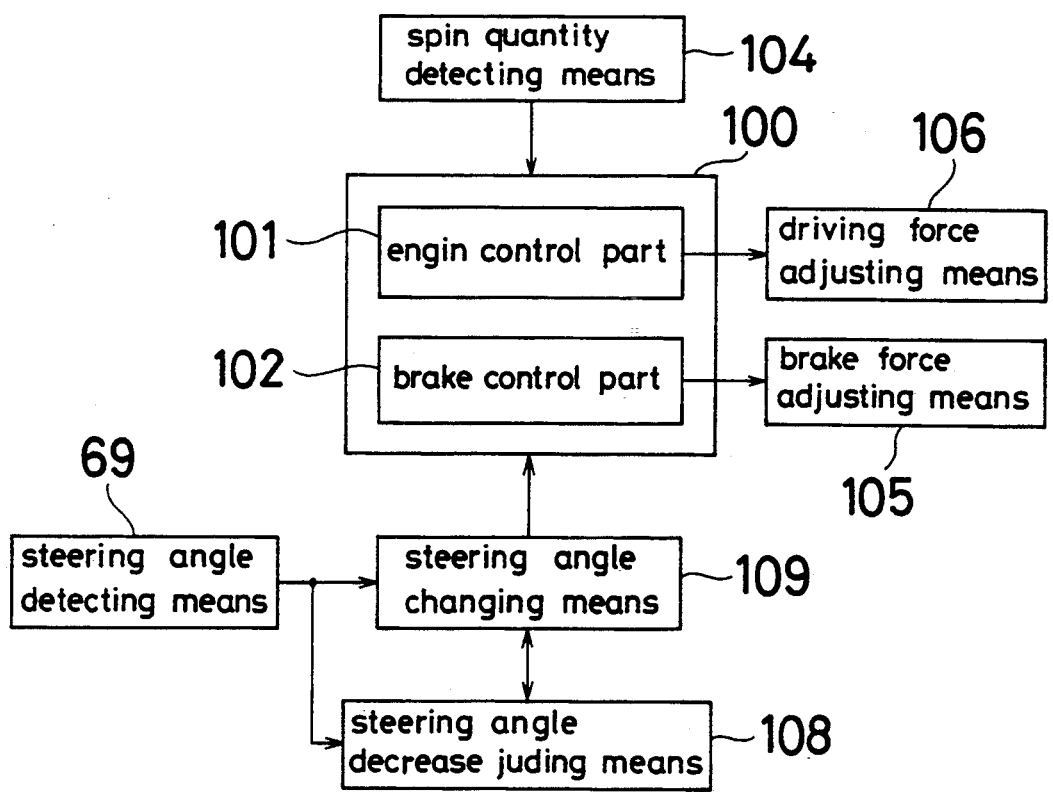

This embodiment relets to a running control system in which running state control means is used as traction control means. As shown in FIG. 1, the traction control means 100 includes an engine control part 101 and a brake control part 102. The engine control part 101 controls brake force adjusting means 105 for adjusting a brake force to be applied to a driving wheel. In detail, the engine control part 101 receives an output from spin quantity detecting means 104 for detecting a spin quantity of the driving wheel with respect to a road surface, and controls the brake force adjusting means 105 so that the spin quantity of the driving wheel reaches to a target spin quantity. The brake force control part 102 receives an output from the spin quantity detecting means 104, and controls driving force adjusting means 106 for adjusting a driving force to be applied to the driving wheel so that the spin quantity of the driving wheel reaches to a target spin quantity. The target spin quantities are set high during a straight run and set low during a turn of a vehicle according to a steering angle.

Provided for enhancing a stability at slalom run and counter steering are steering angle detecting means 107 for detecting a handle steering angle of the vehicle, steering angle decrease judging means 108 for judging whether the steering angle is decreasing based on a detected steering angle by the steering angle detecting means 104, and steering angle changing means 109 for changing the detected steering angle detected by the steering angle detecting means 107 into a filtered steering angle a decrease of which lags behind a decrease of an actual steering angle during the steering angle decrease judging means judges a decrease of the steering angle, and for supplying the filtered steering angle to the traction control means 100.

Figure 2:
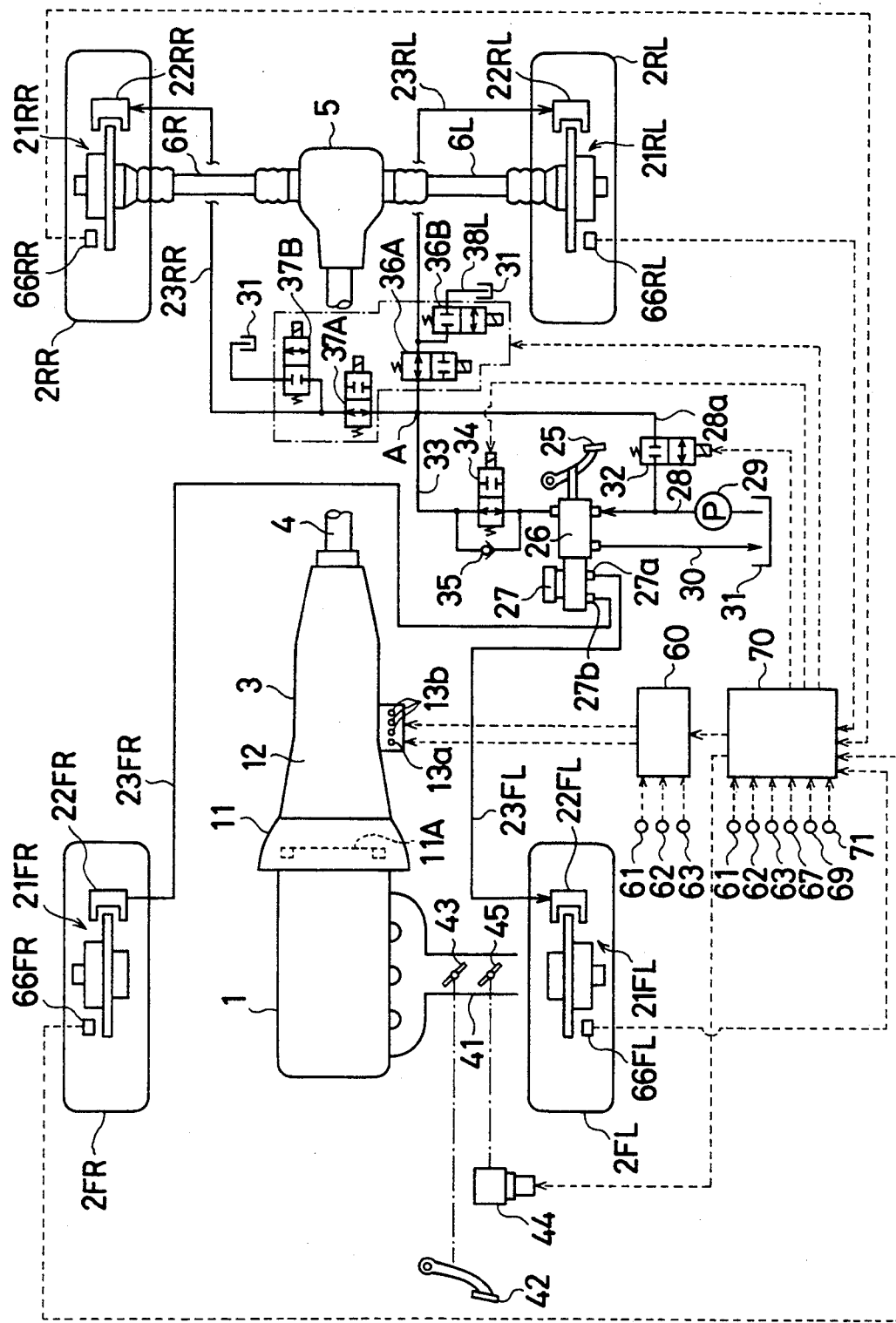

In FIG. 2 showing a whole construction of the traction control system of the vehicle, a right and left front wheels 2FR, 2FL are driven wheels and a right and left rear wheels 2RR, 2RL are driving wheels. An engine 1 is embarked at a front part of the vehicle. A torque generated at the engine 1 is transmitted to a differential gear 5 via an automatic transmission 3 and a propeller shaft 4, then further transmitted to the right rear wheel 2RR through the medium of a right driving shaft 6R, and to the left rear wheel 2RL through the medium of a left driving shaft 6L.

The automatic transmission 3 includes a torque convertor 11 and a stepped speed change gear 12. The stepped speed change gear 12 is of conventional hydraulic type and has four steps for forwarding and one step for retreating. In detail, a speed change is carried out by changing a combination of exciting and halt thereof of a plurality of solenoids 13a built in a hydraulic circuit of the stepped speed change gear 12. The torque converter 11 has a hydraulic lockup clutch 11a. A joint and disjoint of the lockup clutch 11a is carried out by switching exciting and halt thereof of solenoids 13b built in a hydraulic circuit of the lockup clutch 11a.

The solenoids 13a, 13b are controlled by an AT controller 60 for controlling the speed change of the automatic transmission 3. The AT controller 60 pre-memorizes a speed change property and lockup property so as to control the speed change and lockup. In order to perform the controls, the AT controller receives each throttle open signal from a main throttle open sensor 61 for detecting open of a main throttle valve 43 and sub-throttle open sensor 62 for detecting open of a sub-throttle 45, and a vehicle speed signal from a vehicle speed sensor 63 for detecting a vehicle speed (revolution number signal of the propeller shaft 4, in this embodiment).

Brake Force Adjusting Mechanism

Respectively provided at each wheel 2FR, 2FL, 2RR, 2RL are brakes 21FR, 21FL, 21RR, 21RL. A brake fluid is supplied to calipers (wheel cylinders) 22FR, 22FL, 22RR, 22RL of each brake 21FL–21RR via respective brake pipes 23FR, 23FL, 23RR, 23RL. A construction for supplying the brake fluid is as follows.

A stepped force of a brake pedal 25 is transmitted to a tandem master cylinder 27 with the force toggled by hydraulic toggle joint 26. A first outlet 27a of the master cylinder 27 communicates with the brake pipe 23FL for the left front wheel 2FL, and a second outlet 27b of the master cylinder 27 communicates with the brake pipe 23FR for the right front wheel 2FR.

A pressure oil from a pump 29 is supplied to the toggle joint 26 via a pipe 28. An excessive pressure oil thereof returns to a reserve tank 31 via return pipe 30. A branch pipe 28a branched from the pipe 28 is connected to a confluence portion A (to be described later), and has an electromagnetic switching valve 32. An pressure oil, generated at the toggle joint 26, for toggling is supplied to the confluence portion A via a pipe 33. The pipe 33 has an electromagnetic switching valve 34 and a one-way valve 35, arranged in parallel with the switching valve 34, for permitting the oil toward the confluence portion A.

The confluence portion A is connected to the brake pipes 23RL, 23RR for the right and left rear wheels 2RR, 2RL. Each pipe 23RR, 23RL has an electromagnetic switching valve 36A or 37A respectively. Electromagnetic switching valves 36B, 37B are respectively provided at relief passages 38R, 38L connected downstream of each of the switching valves 36A, 37A.

A TRC controller 70 for a traction control controls each switching valve 52, 34, 36A, 37A, 36B, 37B. In detail, when the brake control is not performed, the switching valves 32, 36B, 37B close, and the switching valves 34, 36A, 37A open, as shown in FIG. 2. Consequently, when the brake pedal 25 is stepped, the brake fluid is supplied to the brakes 21FR, 21FL for the front wheels 2FR, 2FL via the master cylinder 27, and oil pressure from the toggle joint 26 according to the stepped force of the brake pedal 25 is supplied as a brake fluid to the brakes 21RR, 21RL for the rear wheels 2RR, 2RL via the pipe 33.

As described later, when the traction control is performed when the spin quantities of the driving rear wheels 2RR, 2RL to a road surface is large, the switching valves 34 closes and the switching valve 32 opens. The maintenance, increase and decrease of the brake fluid is controlled by duty control of the switching valves 36A, 36B (37A, 37B). More specifically, in case the switching valve 32 opens, the brake fluid is maintained when each valve 36A, 36B, 37A, 37B close, the brake fluid increases, when the switching valve 36A (37A) opens and the switching valve 36B (37B) opens, and the brake fluid decreases when the switching valve 36A (37A) closes and the switching valve 36B (37B) opens. The one-way valve 35 interrupts the brake fluid from the branch pipe 28a to affect to the brake pedal 25.

During the traction control, when the brake pedal 25 is stepped, the brake fluid from the toggle joint 26 according to the stepped quantity is supplied to the brakes 21RR, 21RL for the rear wheels 2RR, 2RL via the one-way valve 35.

Driving Force Adjusting Mechanism

In order to decrease a driving torques of the driving wheels 2RR, 2RL, the TRC controller 70 performs a brake control for the driving wheels 2RR, 2RL, and also performs a decrease of the driving force transmitted to the driving wheels 2RR, 2RL, i.e., the torque generated at the engine 1. Provided at an intake passage 41 of the engine 1 are the main throttle valve 43 connected to an accelerator pedal 42, and the sub-throttle valve 45 connected to an actuator 44 for adjusting the throttle opens. The TRC controller 70 controls the sub-throttle valve 45 via the actuator 44.

TRC Controller 70

During the traction control, the TRC controller 70 performs the brake control, a lockup control via the AT controller 60 for controlling the speed change, and an engine control of controlling the actuator 44 for adjusting the throttle open. In addition to signals from the throttle open sensors 61, 62 and vehicle speed sensor 63, the TRC controller 70 receives wheel speed signals from each wheel speed sensor 66FR, 66FL, 66RR, 66RL for detecting respective speeds of the wheels 2FR–2RL, an acceleration open signal from an acceleration open sensor 67 for detecting acceleration open (stepped quantity of the accelerator pedal 42), a handle steering angle signal from a steering angle sensor 69 for detecting the steering angle, and a mode signal from a mode switch 71 operated manually.

The TRC controller 70 includes an input interface for receiving the signals from each of the above sensors, a micro computer composed of CPU, ROM and RAN, an output interface, and a driving circuit for driving the valves 32, 36A, 37A, 36B, 37B and the actuator 44. A control program and each kind of maps required for controlling a spin is provided in the ROM. Each kind of memories required for performing the controls are provided in the RAM.

Traction Control

Figure 3:
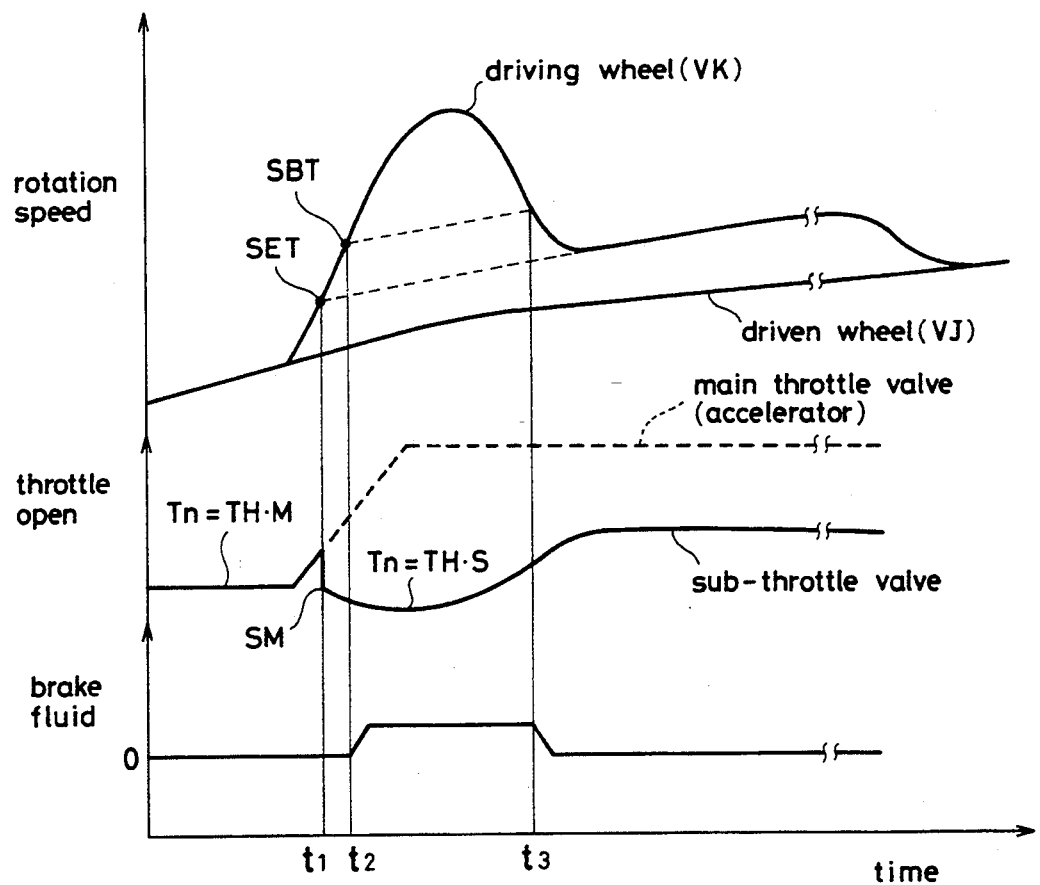

FIG. 3 shows the traction control by the TRC controller 70 regarding the engine control and brake control. In FIG. 3, SET indicates a target quantity for the engine (target spin quantity of the driving wheel), and SBT indicates a target quantity for the brake (SBT>SET).

The engine control is not performed until time $t_1$ since severe spin does not occur on the driving wheels. Accordingly, the sub-throttle valve 45 opens to full, and a throttle open Tn (smaller throttle open of both throttle valves 43, 45) is the main throttle open TH.M which corresponds to the acceleration open.

The time $t_1$ is the time when a severe spin occurs (the spin quantity of the driving wheel reaches to the engine target quantity SET). In this embodiment, the traction control is activated when the spin quantity of the driving wheel is more than SET, so that at the time $t_1$ the throttle open is decreased at once to a lowest limit of a control value SM (feed-forward control). After the throttle open is once decreased to SM, open of the sub-throttle valve 45 is feedback controlled so that the spin quantity of the driving wheel reaches to the engine target quantity SET. At this time, the throttle open Tn is the sub-throttle open TH.S.

Time $t_2$ is time when the spin quantity of the driving wheel is more thorn the brake target quantity SBT. At this time, the brake fluid is supplied to the brakes 21RR, 21RL for the driving wheels 2RR, 2RL to activate the traction control by both engine control and brake control. The brake fluid is feedback controlled so that the spin quantity of the driving wheel reaches to the brake target quantity STB.

Time t3 is time when the spin quantity of the driving wheel is less than the brake target quantity SBT. Thereby, the brake fluid is gradually decreased to be zero. Wherein, the traction control by the engine is still continued.

In this embodiment, when the acceleration open is completely closed, the traction control terminates.

Detection of Slip Quantity

The spin quantity of the driving wheel is detected based on the detection signals from the wheel speed sensors 66FR, 66FL, 68RR, 68RL. In detail, the spin quantity detecting means 104 calculates the spin quantity by subtracting a rotation speed of the driven wheel from that of the driving wheel. In the calculation of the spin quantity, in case of the engine control, a larger rotation speed of the right and left driving wheels is elected and an average value of the rotation speeds of the right and left driven wheels are used. In case of the brake control, the same driven wheel rotation speed is used as in the case of the engine control and each right and left driving wheel rotation speed is used in case where the brake force is controlled independently to the right and left diving wheels.

Setting of Target Quantities SET, SBT

Figure 4:
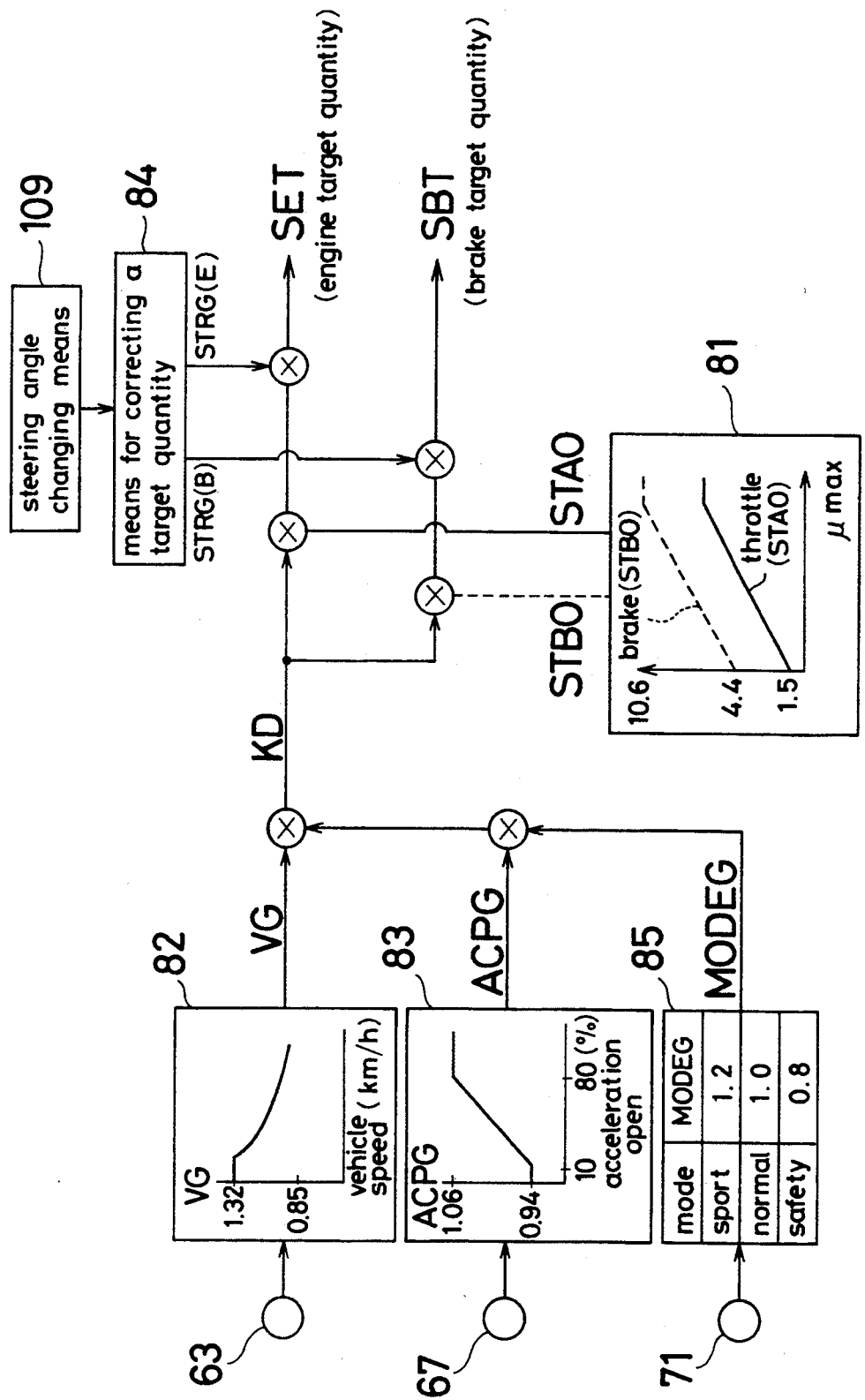

FIG. 4 shows in blocks a circuit for determining the target quantities SET, SBT. For determining them, there are parameters of the vehicle speed, the acceleration open, the handle steering angle, an operation state of the mode switch 71, and a maximum friction coefficient $\mu$ max of a road surface.

In FIG. 4, respective base quantities STA0, STB0 (STB0>STA0) for each target quantity SET, SBT are memorized in a map 81 as the parameter of the maximum friction coefficient. The target quantities SET, SBT are obtained by multiplying the respective base quantities STB0, STA0 and a correction gain KD of the vehicle speed, acceleration open and operation state of the mode switch 71, then respectively multiplying each correction gain STRG(E), STRG(B) corresponding to the steering angle.

The above correction gain KD is obtained by multiplying each gain VG, ACPG, SRTG and MODEG. The gain VG depends on the vehicle speed and is memorized in a map 82. The gain ACPG depends on the acceleration open and is memorized in a map 83. The gain MODEG is manually elected by a driver and memorized in a table 85. The table 85 has a three kinds of mode, i.e., a sport mode, normal mode and safety mode.

Each correction gain STRG(E), STRG(B) depends on the steering angle. Means 84 for correcting the target quantity correspondingly to the steering angle sets the correction gain STRG(E), STRG(B) so as to decrease each predetermined quantity when the steering angle is more than 30 degree. For example, as shown in a following table, in a certain driving state, when the target quantities SET, SBT during a straight run are 2 km/h and 5 km/h respectively, each target quantity SET, SBT is set 5 km/h, 10 km/h respectively when the steering angle is more than 30 degree.

TABLE

| Steering Angle $\theta$ H | SET | SBT |
|---|---|---|
| $\geq 30°$ | 2 km/h | 5 km/h |
| $<30°$ | 5 km/h | 10 km/h |

Change of Steering Angle

The steering angle decrease judging means 108 judges that the steering angle is decreasing when a formula (1) is met based on an absolute value $|\theta(K)|$ of the steering angle detected by the steering angle detecting means 69 at a present time and an output value $\theta H(K-1)$ of the steering angle change means 109 at a previous time.

$$\theta H(K-1) \geq |\theta(K)| \tag{1}$$

When the steering angle decrease judging means 108 judges a decrease of the steering angle, the steering angle changing means 109 changes the control steering angle from the actual steering angle detected by the steering angle detecting means 69 to the filtered steering angle the decrease of which lags behind (is slower than) the decrease of the actual steering angle in such a manner that the previous output value $\theta H(K-1)$ is borne with a predetermined percentage to the absolute value $|\theta(K)|$ of the present detected steering angle as indicated in a following formula (2).

$$\theta H(K) \leftarrow \tfrac{1}{2} \times \theta H(K-1) + \tfrac{1}{2} \times |\theta(K)| \tag{2}$$

In the above formula (2), a half of the previous output value is borne to the present detected value. A bearing ratio may be different, for example, one eighth as a formula (3).

$$\theta H(K) \leftarrow \tfrac{1}{8} \times \theta H(K-1) + \tfrac{7}{8} \times |\theta(K)| \tag{3}$$

Figure 5:
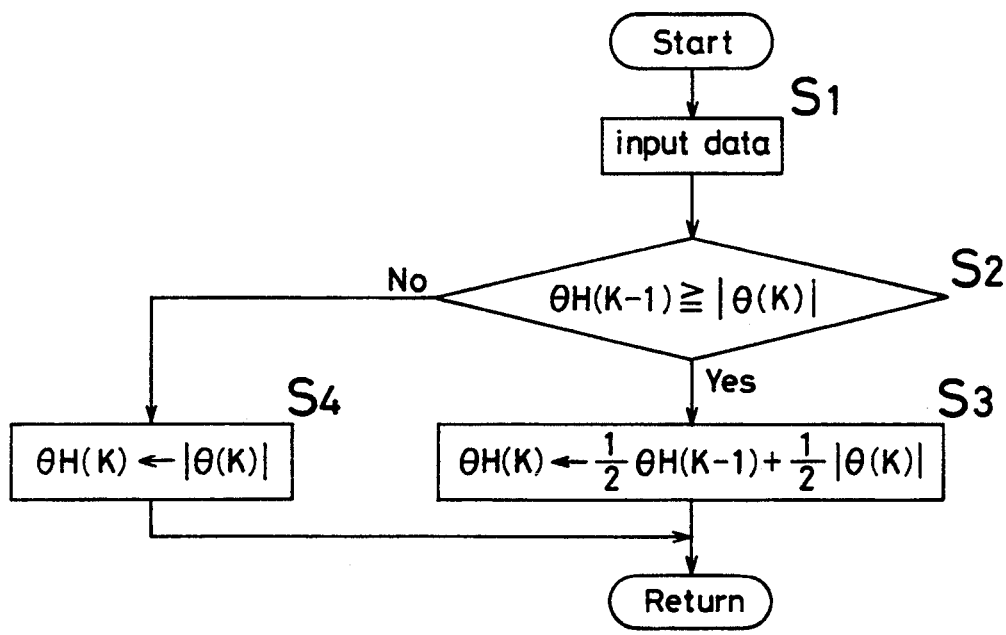

A flow of the change of the steering angle is shown in FIG. 5. In detail, date of the steering angle from the steering angle detecting means 69 are inputted at step S1. When the formula (1) is met (during the steering angle is decreasing) at step S2, the absolute value of the steering angle with being corrected by the formula (2) is given to the means 84 for correcting the target quantity correspondingly to the steering angle at step S3. When the formula (1) is not met (during the steering angle is constant, or increasing) at step S2, the absolute value of the detected steering angle is given without correction to the means 84 at step S4.

Figure 6:
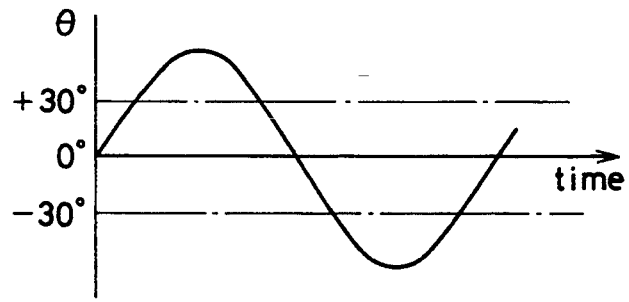
Figure 7:
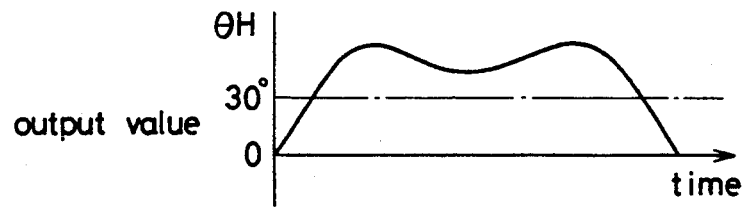

Consequently, when the actual steering angle $\theta$ is varied as shown in FIG. 6, for example, during a slalom run, the output value of the steering angle changing means 109 is avoided being less than 30 degree by filtering the actual steering angle during the steering angle is decreasing, as shown in FIG. 7. Hence, even if the actual steering angle $\theta$ becomes zero during the slalom run, the target quantity of the traction control is maintained at high value, thus preventing the engine from an excessive output.

SECOND EMBODIMENT

Figure 8:
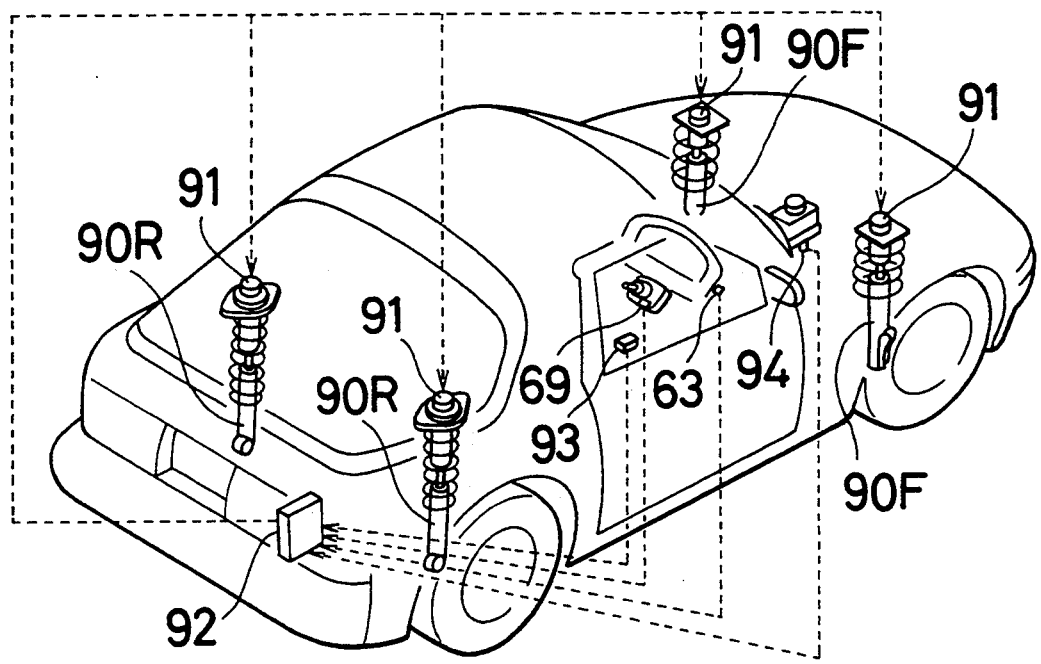
FIG. 8 is a perspective view of a running state control system of a second embodiment.

In this embodiment, the running state control means is used as an AAS shown in FIG. 8.

In FIG. 8, a reference numeral 90F designates front shock absorbers provided at right and left sides of a front part of a vehicle and 90R designates rear shock absorbers provided at right and left sides of a rear part thereof. Each shock absorber 90F, 90R has an actuator 91 for adjusting a damping ratio. An AAS control unit 92 for controlling each damping ratio of the shock absorbers 90F, 90R receives each signal from the vehicle speed sensor 63, the steering angle sensor 69, an acceleration switch 93 and a brake pressure switch 94 to output a control signal to each actuator 91 so as to obtain a predetermined control target quantity (damping ratio).

In this case, the control target quantity based on the steering angle $\theta H$ is set so that each damping ratio is small (hard) when $\theta H \geq 30°$ and is large (soft) when $\theta H < 30°$.

The control unit 92 includes, as in the first embodiment, the steering angle decrease judging means for judging the steering angle decrease based on the signal from the steering angle sensor 69, and the steering angle changing means for filtering the steering angle when the steering angle decrease is judged.

Consequently, even when the actual steering angle H$\theta$ becomes zero during a slalom run or counter steering, each damping ratio is maintained small (hard) without being changed into large (soft), thus enhancing the running stability during such the runs.

In the first and second embodiments, the control target quantities are changed in two steps according to the steering angle. Such the changes may be continuous.

The running state control system in the present invention is, of course, applicable to an active suspension system and the like other than the traction control system and AAS.

What is claimed is:

1. A running state control system for a vehicle having running state control means for controlling running state of the vehicle, in which control target quantities for controlling the running state are set different according to a control steering angle, said running state control system comprising:

steering angle detecting means for detecting an actual steering angle;

steering angle changing means for changing the control steering angle from the actual steering angle detected by said steering angle detecting means to a filtered steering angle a decrease of which lags behind a decrease of the actual steering angle; and steering angle decrease judging means for judging that the actual steering angle is decreasing when the absolute value of the present actual steering angle detecting by said steering angle detecting means is smaller than the previous output value of said steering angle changing means, wherein said steering angle changing means changes the control steering angle from the actual steering angle to the filtered steering angle when said steering angle decrease judging means judges the decrease of the actual steering angle.

2. A running state control system defined in claim 1, wherein said steering angle changing means obtains the filtered angle based on a formula, $$\theta H(K) \leftarrow \alpha \times |\theta(K)| + (1-\alpha) \times \theta H(K-1)$$

wherein $\theta H(K)$ is an output value of said steering angle changing means at a present time (a filtered steering angle), $\theta H(K-1)$ is an output value thereof at a previous time (a filtered steering angle), $|\theta(K)|$ is an absolute value of the actual steering angle detected by said steering angle detecting means at the present time, and $\alpha$ is larger than 0 and smaller than 1.

3. A running state control system defined in claim 1, wherein said running state control means serves as traction control means for controlling a driving wheel so that a spin quantity of said driving wheel with respect to a road surface reaches to a target quantity, and the target quantity is changed according to the control steering angle.

4. A running state control system defined in claim 3, wherein said traction control means is composed of:

engine control means for controlling an engine output so that the spin quantity of said driving wheel with respect to a road surface reaches to a first target quantity; and brake control means for controlling a brake force to be applied to said driving wheel so that the spin quantity of said driving wheel with respect to a road surface reaches to a second target quantity, the first and second target quantities being respectively set high during a straight run and set low during a turn of the vehicle according to the control steering angle.

5. A running state control system defined in claim 4, wherein the first and second target quantities are respectively set low as a vehicle speed is high and set low as a stepped quantity of an accelerator pedal is large.

6. A running state control system defined in claim 5, wherein the first and second target quantities are respectively set low as a friction coefficient of a road surface is small.

7. A running state control system defined in claim 1, wherein said running state control means serves as an automatic adjusting suspension for controlling each damping ratio of shock absorbers respectively provided at front right side, front left side, rear right side and rear left side of the vehicle, and a control target quantity of damping ratio is changed according to the control steering angle.

8. A running state control system defined in claim 7, wherein said automatic adjusting suspension controls each actuator, provided at each of said shock absorbers, for adjusting each damping ratio according to running conditions of the vehicle, and a control target quantity of each damping ratio is set high during a straight run and set low during a turn of the vehicle.

* * * * *